W. J. MILLER.
SANITARY VACUUM BEER MUG.
APPLICATION FILED DEC. 21, 1910.
1,031,950. Patented July 9, 1912.
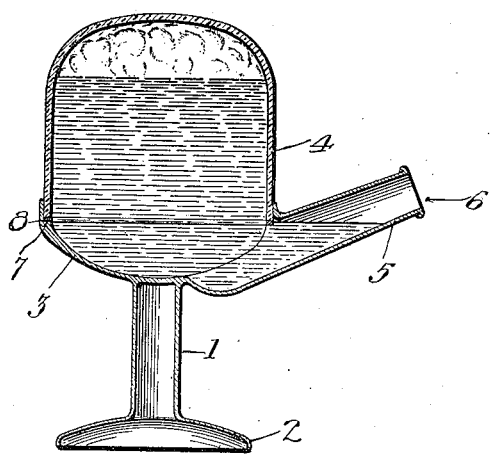
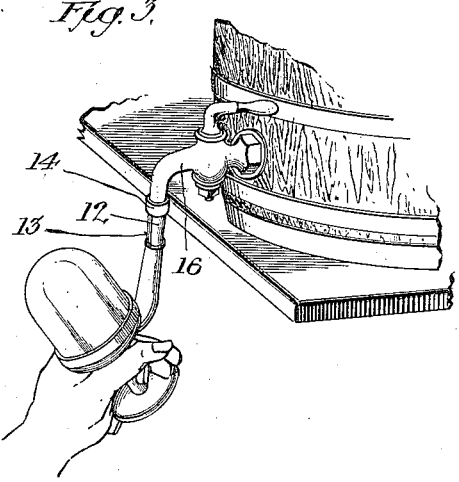
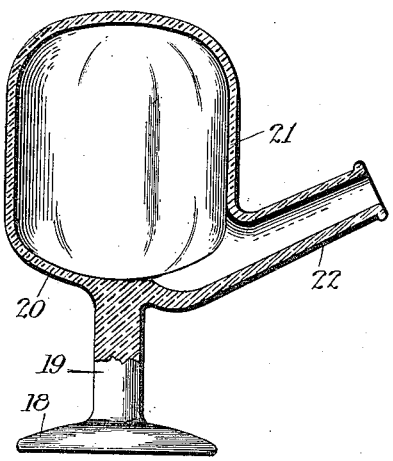
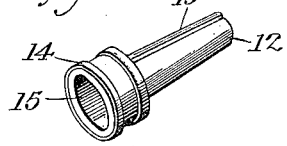
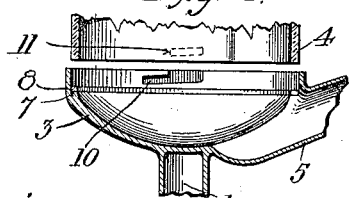

UNITED STATES PATENT OFFICE.

WALTER J. MILLER, OF LOS ANGELES, CALIFORNIA, ASSIGNOR OF ONE-FOURTH TO J. R. FRENCH AND ONE-FOURTH TO JULIUS MICHELSEN, BOTH OF LOS ANGELES, CALIFORNIA.

SANITARY VACUUM BEER-MUG.

1,031,950.

Specification of Letters Patent. Patented July 9, 1912.

Application filed December 21, 1910. Serial No. 598,649.

*To all whom it may concern:*

Be it known that I, WALTER J. MILLER, a citizen of the United States, residing at Los Angeles, in the county of Los Angeles and State of California, have invented a new and useful Sanitary Vacuum Beer-Mug, of which the following is a specification.

The main object of the invention is to provide a device especially adapted for use as a beer mug, in which the beer will be retained in fresh and sparkling condition for considerable time.

Another object of the invention is to provide a device of this character which, to a great extent, safeguards the liquid contained therein from contamination.

Another object of the invention is to provide a sanitary beer mug or drinking vessel which can be readily washed or cleaned both inside and out.

Other objects of the invention will appear hereinafter.

The accompanying drawings illustrate the invention, and referring thereto: Figure 1 is a vertical section of the mug. Fig. 2 is a vertical section of portions of the mug and its supporting stand in separated condition. Fig. 3 is a perspective showing the manner of filling the mug. Fig. 4 is a perspective of a nozzle used in the filling operation. Fig. 5 is a vertical section of a modified form of the mug, showing the construction of the same in one piece.

In the form of the invention shown in Figs. 1 and 2, the mug comprises a stand 1 formed with a base 2 for resting on a suitable support and provided with a bowl 3 at its upper end, said bowl engaging and fitting the lower end of a glass dome 4 forming a vessel for holding the beer or other liquid, said vessel being closed at the top. Said bowl 3 is further provided with a laterally extending tube or spout 5 communicating with the interior of the bowl and open at the outer end, said spout inclining upwardly and outwardly so that the opening 6 at the outer end thereof is somewhat above the bottom of the dome 4 but below the top of the dome-shaped vessel 4. Said bowl 3 is formed with an annular shoulder 7 on which the lower edge of the dome 4 is supported, a gasket 8 of suitable packing material being interposed between this shoulder and the dome, to make a tight joint, and suitable interengaging means being provided on the bowl 3 and dome 4 to hold the dome in position, said means comprising, for example, a bayonet slot 10 (Fig. 2) on the bowl 3 engaged by a flange or projection 11 on the dome 4. The laterally extending spout tapers from its inner to its outer end and the cross section of said spout is at all parts thereof much less than that of the dome or chamber for containing the beverage, so that when the device is tipped, but a small proportion of the fluid in the dome will flow into said spout and the liquid seal between the spout and dome will be maintained.

For filling the device, a tapered nozzle, indicated at 12, in Figs. 3 and 4, is provided, said nozzle being adapted to enter the spout 5 of the mug and having a longitudinal fin or rib 13 which, engaging with the inside of the tube 5, insures that a space will be left around the nozzle 12 for outflow of air as it is displaced by the inflowing liquid. An enlargement 14 at the upper end of this nozzle is provided with an internal bushing 15 of rubber adapted to engage the end of the faucet 16, as shown in Fig. 3, so as to make a tight joint and hold the nozzle on the faucet.

The nozzle 12 having been placed on the faucet and its tapered lower end having been inserted in the tube 5, the faucet is turned on to allow the beer or other liquid to pass down through said nozzle and tube 5 into the mug until the mug is charged fully as may be desired. The mug being then placed in an upright position, as shown in Fig. 1, the beer or liquid is retained therein by atmospheric pressure, the bottom of the wall of dome 4 forming a liquid seal, as it extends below the mouth 6 of the outlet tube 5, but by tipping the mug over so as to lower the mouth of the outlet tube sufficiently, the beer or liquid will flow out of said mouth, air bubbling up through the tube or dome to replace the liquid. By tipping the receptacle in this manner a person may drink therefrom by applying the lips to the opening or mouth of the spout or tube 5. The upper part of the vessel being of glass, the contents thereof are always visible.

The formation of the dome-shaped vessel closed at the top and extending above the upper end of the drinking spout is of advantage in that when the vessel is full or nearly full, the liquid is sustained as stated, by atmospheric pressure from the outside, the level of the liquid in the vessel being above the level of the liquid in the spout. To cause the liquid to flow into and through the spout it is, therefore, only necessary for the drinker to allow or cause air to pass from his mouth through the spout into the vessel and the liquid so displaced will flow through the spout without necessitating any considerable tipping of the vessel.

While the formation of the mug into two separable parts, as above described, presents certain advantages, particularly in respect to cleaning the same, the mug may, if desired, be made of one piece of glass, as shown in Fig. 5, where the base 18, stand or post 19, bowl 20, dome 21 and spout 22 are all formed of a single molded glass member, the bowl 20 and dome 21 being merged in a single hollow vessel.

What I claim is:

1. A sanitary mug consisting of a vessel closed at the top and having a spout extending obliquely upward and outward from the lower portion of said vessel and open at the outer end, said outer end being below the top of the vessel, said vessel being of much larger cross section than said spout and being provided with a wall portion extending downwardly below the level of the outlet of the spout to form a liquid seal when the vessel is filled with liquid.

2. A mug comprising a stand formed with a base, a vessel on the upper end of said stand, said vessel being closed and dome-shaped at the top and a spout extending from the lower portion of said vessel obliquely upward and outward, and terminating below the top of said vessel, said spout being tapered from its inner to its outer end and being of much smaller cross section than said dome-shaped vessel.

In testimony whereof, I have hereunto set my hand at Los Angeles, California, this 16th day of December, 1910.

WALTER J. MILLER.

In presence of—
FREDERICK S. LYON,
GEORGE T. HACKLEY.

---

Copies of this patent may be obtained for five cents each, by addressing the "Commissioner of Patents, Washington, D. C."